(12) United States Patent
Nakamura et al.

(10) Patent No.: US 10,482,189 B2
(45) Date of Patent: Nov. 19, 2019

(54) ANALYSIS DEVICE AND PROGRAM

(71) Applicant: YAZAKI CORPORATION, Tokyo (JP)

(72) Inventors: Yoshinori Nakamura, Makinohara (JP); Sadao Fujiwara, Makinohara (JP); Kei Nunome, Makinohara (JP); Satoru Goto, Makinohara (JP); Yuki Ebata, Makinohara (JP); Takeshi Ishikawa, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 460 days.

(21) Appl. No.: 15/053,128

(22) Filed: Feb. 25, 2016

(65) Prior Publication Data

US 2016/0171129 A1    Jun. 16, 2016

Related U.S. Application Data

(63) Continuation of application No. PCT/JP2014/072643, filed on Aug. 28, 2014.

(30) Foreign Application Priority Data

Aug. 29, 2013  (JP) .................. 2013-178075

(51) Int. Cl.
    *G06F 17/50*    (2006.01)
    *B60R 16/02*    (2006.01)
    *H02G 3/04*     (2006.01)

(52) U.S. Cl.
    CPC .......... *G06F 17/50* (2013.01); *G06F 17/5095* (2013.01); *B60R 16/0215* (2013.01);
    (Continued)

(58) Field of Classification Search
    None
    See application file for complete search history.

(56) References Cited

U.S. PATENT DOCUMENTS 6,087,593 A *  7/2000  Skipworth .......... B60R 16/0215
                                                174/135
6,444,903 B2 * 9/2002  Saeki ................... H02G 3/0437
                                                174/135

(Continued)

FOREIGN PATENT DOCUMENTS

JP    2003-132102 A    5/2003
JP    2003-151383 A    5/2003

(Continued)

OTHER PUBLICATIONS

International Search Report for PCT/JP2014/072643 dated Dec. 2, 2014 [PCT/ISA/210].

(Continued)

*Primary Examiner* — Kibrom K Gebresilassie
(74) *Attorney, Agent, or Firm* — Sughrue Mion, PLLC

(57) ABSTRACT

An analysis device includes a memory unit, a recording unit, and an arithmetic processing unit. The arithmetic processing unit determines, by referring to a physical value of each of elements stored in the memory unit and a program recorded in the recording unit, whether or not a protector main body and a lid are in contact with each other in reproducing a state where a harness is contained inside the protector main body and an opening of the protector main body is covered by the lid.

5 Claims, 7 Drawing Sheets

(52) U.S. Cl.
CPC ....... *G06F 2217/36* (2013.01); *H02G 3/0418* (2013.01); *H02G 3/0437* (2013.01); *H02G 3/0487* (2013.01)

(56) References Cited

U.S. PATENT DOCUMENTS

| | | | | |
|---|---|---|---|---|
| 8,575,487 | B2* | 11/2013 | Agusa | H02G 3/0487 174/68.3 |
| 9,799,197 | B2* | 10/2017 | Pham | A62B 35/0006 |
| 2001/0017214 | A1* | 8/2001 | Saeki | H02G 3/0437 174/505 |
| 2003/0020711 | A1 | 1/2003 | Sakakura et al. | |
| 2003/0020715 | A1 | 1/2003 | Sakakura et al. | |
| 2003/0023947 | A1* | 1/2003 | Sakakura | B60R 16/0207 716/126 |
| 2003/0050723 | A1* | 3/2003 | Ozaki | B60R 16/0207 700/97 |
| 2004/0172151 | A1* | 9/2004 | Sawai | B60R 16/0207 700/103 |
| 2009/0301758 | A1* | 12/2009 | Suzuki | B60R 16/0215 174/135 |
| 2010/0122451 | A1* | 5/2010 | Yang | G06F 17/5009 29/703 |
| 2010/0235157 | A1* | 9/2010 | Vedula | G06F 17/5009 703/13 |
| 2011/0046763 | A1* | 2/2011 | Tsuchiya | G06F 17/5095 700/98 |
| 2011/0153280 | A1 | 6/2011 | Yamada et al. | |
| 2012/0298404 | A1* | 11/2012 | Tokunaga | B60R 16/0215 174/135 |
| 2013/0008711 | A1* | 1/2013 | Toyama | B60R 16/0215 174/70 R |
| 2013/0249749 | A1* | 9/2013 | Nitta | B60R 16/0207 343/720 |
| 2014/0330537 | A1* | 11/2014 | Iimori | G06F 17/50 702/182 |
| 2015/0241499 | A1* | 8/2015 | Watanabe | G06F 17/5045 324/66 |
| 2018/0361959 | A1* | 12/2018 | Toyosaka | B60R 16/0215 |
| 2019/0013654 | A1* | 1/2019 | Suenaga | H02G 3/0487 |

FOREIGN PATENT DOCUMENTS

| | | |
|---|---|---|
| JP | 2009-181746 A | 8/2009 |
| JP | 2009-205401 A | 9/2009 |
| WO | 2010/023988 A1 | 3/2010 |

OTHER PUBLICATIONS

Written Opinion for PCT/JP2014/072643 dated Dec. 2, 2014 [PCT/ISA/237].

English Translation of Written Opinion, issued by International Searching Authority in corresponding International Application No. PCT/JP2014/072643 dated Dec. 2, 2014 [PCT/ISA/237], which was disclosed in the IDS filed on Feb. 25, 2016.

* cited by examiner

ANALYSIS DEVICE AND PROGRAM

CROSS REFERENCE TO RELATED APPLICATIONS

This application is a continuation of PCT application No. PCT/JP2014/072643, which was filed on Aug. 28, 2014 based on Japanese Patent Application (No. P2013-178075) filed on Aug. 29, 2013, the contents of which are incorporated herein by reference.

BACKGROUND OF THE INVENTION

1. Field of the Invention

The present invention relates to an analysis device that constructs an image of a shape of a wire harness by arithmetic processing, and a program to be executed by the analysis device.

2. Description of the Background Art

Before actually producing a wire harness, a virtual wire harness is modeled on a computer, and the virtual wire harness is examined at the design stage. Examples of this type of simulation are disclosed in JP-A-2003-132102 and JP-A-2009-181746.

There is a demand for evaluation made by utilizing the above-described simulation to determine whether or not a protector externally protecting a harness is in a shape capable of containing the harness within an inside space of the protector without allowing the harness to protrude out of the inside space. In order to realize such simulation, the present applicant has conceived the following method: First, one model is defined as a wire harness. Here, assuming that the wire harness includes a wire, a connector, a clamp and a protector, conditions for specifying the wire, such as the diameter, the length, the number of the wire, and a physical value specified by the material of the wire, are given as initial parameters, conditions for specifying the connector, such as the shape of the connector, the attaching position on the wire and a physical value specified by the material of the connector, are given as initial parameters, conditions for specifying the clamp, such as the shape of the clamp, the attaching position on the wire and a physical value specified by the material of the clamp, are given as initial parameters, and conditions for specifying the protector, such as the shape of the protector, the attaching position on the wire and a physical value specified by the material of the protector, are given as initial parameters.

Next, in the thus defined one model, with prescribed coordinates given for the connector or the wire, coordinates corresponding to the positions of respective elements of the wire are calculated on the basis of conditions specifying a given element or a relationship between elements. Here, as the prescribed coordinates given for the connector or the wire, three-dimensional coordinates of a course of the wire entering the inside space of the protector are given. The coordinates are thus given on the assumption of the course where an operator puts the wire in the protector. Besides, the conditions specifying a given element or a relationship between elements refer to physical phenomenons, formulated as basic equations, to be followed by the respective elements of the modeled wire harness, such as the influence of gravity on each element, the influence of stress on each element, the influence of an elastic force mutually caused between adjacent elements, and a boundary condition.

In this manner, the virtual wire harness is modeled on a computer so as to reproduce the modeled wire harness in a state where its shape can be visually confirmed, and thus, it is evaluated whether or not the protector is in a shape capable of containing the harness within the inside space thereof. Specifically, an analyzer visually confirms the image of the wire harness reproduced through the simulation to evaluate whether or not the wire protrudes out of the inside space of the protector. In this evaluation method, however, the determination is visually made by an analyzer (a human). Therefore, this evaluation method is unavoidably subjective.

SUMMARY OF THE INVENTION

The present invention was accomplished in consideration of the above-described circumstances, and an object is to provide an analysis device and a program capable of objectively evaluating whether or not a protector for externally protecting a harness is in a shape capable of containing the harness within an inside space of the protector without allowing the harness to protrude out of the inside space.

In order to achieve the above-described object, the analysis device of the present invention is characterized by the following (1) to (3):

(1) An analysis device for evaluating whether or not a lid for covering an opening of a protector main body is attachable to the protector main body with a harness contained inside through the opening, the analysis device including:

a memory unit configured to store a physical value of an element corresponding to a part of the harness, a physical value of an element corresponding to a part of the protector main body, and a physical value of an element corresponding to a part of the lid in a modeled wire harness with respect to each of the elements;

a recording unit configured to record a program for expressing an analysis order on the basis of conditions for specifying a given element or a relationship between elements; and an arithmetic processing unit that determines, by referring to the physical value of each of the elements stored in the memory unit and the program recorded in the recording unit, whether or not the protector main body and the lid are in contact with each other in reproducing a state where the harness is contained inside the protector main body and the opening of the protector main body is covered by the lid.

(2) The analysis device according to (1) above, in which a physical value of an element corresponding to a part of the lid divided, for modeling, into a first lid portion and a second lid portion is stored in the memory unit with respect to each element, and the arithmetic processing unit determines whether or not the protector main body and the first lid portion are in contact with each other and whether or not the protector main body and the second lid portion are in contact with each other.

(3) The analysis device according to (2) above, in which a physical value of an element corresponding to a part of the protector main body including a first latch portion and a second latch portion, and a physical value of an element corresponding to a part of the lid divided, for modeling, into the first lid portion having a first latched portion and the second lid portion having a second latched portion are stored in the memory unit with respect to each element, and the arithmetic processing unit determines whether or not the first latch portion and the first latched portion are in contact with each other and whether or not the second latch portion and the second latched portion are in contact with each other.

The analysis device configured as described in (1) above can objectively evaluate whether or not a protector externally protecting a harness is in a shape capable of containing the harness within an inside space of the protector without allowing the harness to protrude out of the inside space.

The analysis device configured as described in (2) above can specify, if the harness protrudes out of the inside space of the protector, a portion where the harness protrudes.

The analysis device configured as described in (3) above can specify, if the harness protrudes out of the inside space of the protector, a portion where the harness protrudes.

In order to achieve the above-described object, the program of the present invention is characterized by the following (4):

(4) A program for causing a computer to function as the memory unit, the recording unit and the arithmetic processing unit according to any one of (1) to (3) above.

The program configured as described in (4) above can objectively evaluate whether or not a protector externally protecting a harness is in a shape capable of containing the harness within an inside space of the protector without allowing the harness to protrude out of the inside space.

According to the analysis device and the program of the present invention, it can be objectively evaluated whether or not a protector for externally protecting a harness is in a shape capable of containing the harness within an inside space of the protector without allowing the harness to protrude out of the inside space.

The present invention has been briefly described so far. The details of the present invention will be further clarified by reading the following aspects for practicing the present invention (hereinafter referred to as the "embodiments") described below with reference to the accompanying drawings.

DETAILED DESCRIPTION OF THE EXEMPLARY EMBODIMENTS

Specific embodiments of the present invention will now be described with reference to the accompanying drawings.

First Embodiment

A first embodiment of the present invention will now be described.

[Algorithm for Constructing Image of Shape of Wire Harness]

In an embodiment of the present invention, a virtual wire harness is modeled on a computer by a finite element method, and the modeled wire harness is reproduced in a state where its shape can be visually confirmed, so as to evaluate whether or not a protector is in a shape capable of containing a harness within an inside space thereof. Incidentally, the embodiment of the present invention will be described on the assumption that the finite element method is applied as a numerical analysis method, but the algorithm for constructing an image of the shape of a wire harness employed in the present invention is not limited to one based on the finite element method.

[Structure of Wire Harness]

Figure 1A:
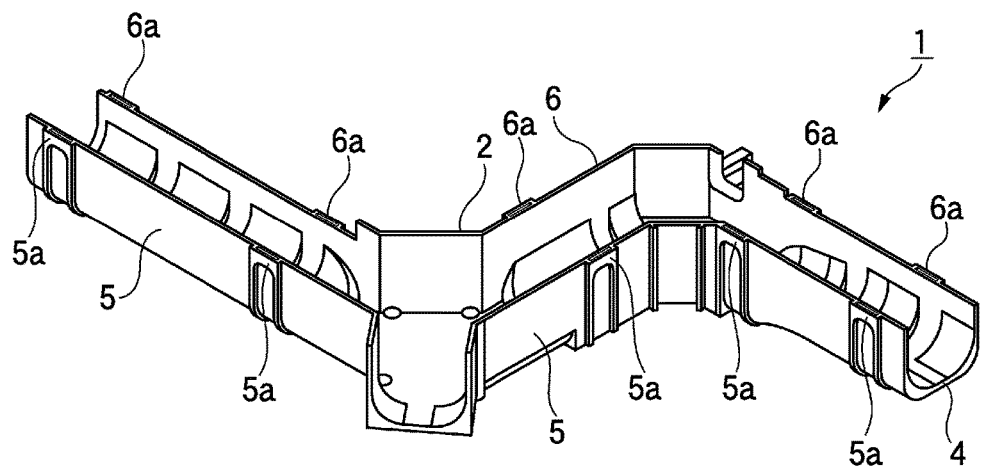
FIG. 1A is a perspective view of a protector main body of a wire harness applied to an embodiment of the present invention.
Figure 1B:
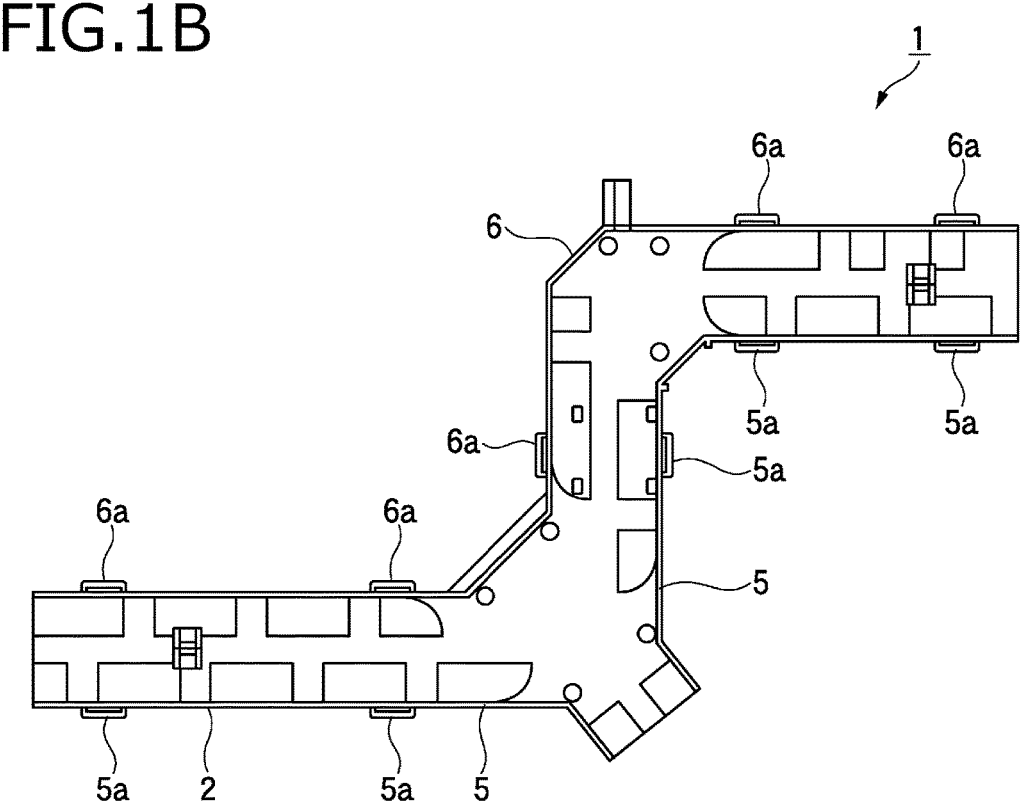
FIG. 1B is a front view of the protector main body of the wire harness applied to the embodiment of the present invention.
Figure 2A:
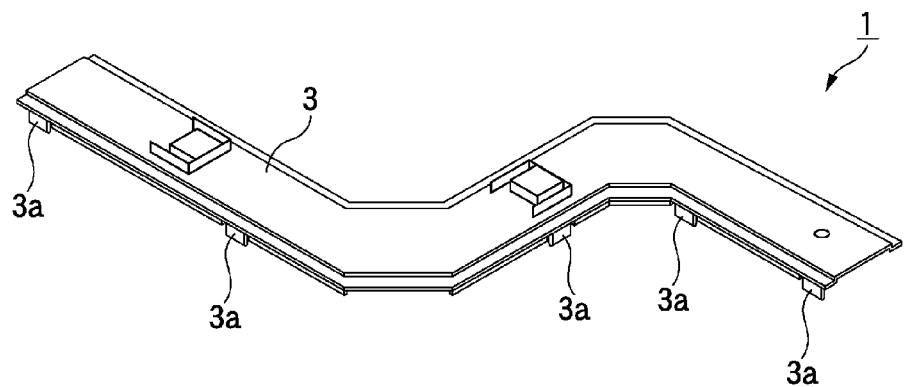
FIG. 2A is a perspective view of a lid of a wire harness applied to a first embodiment of the present invention.
Figure 2B:
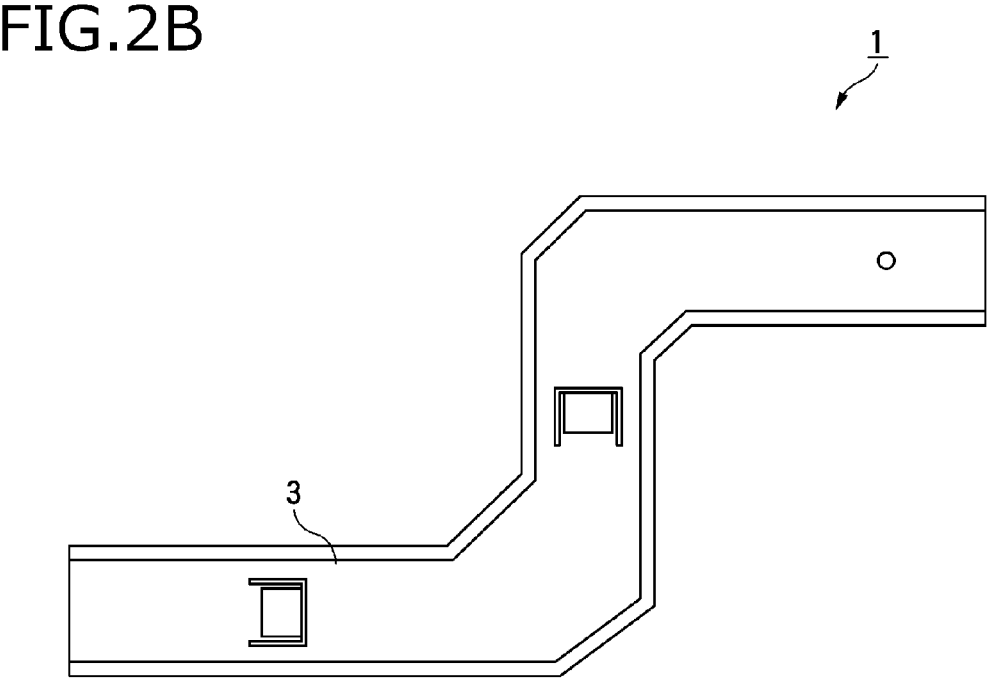
FIG. 2B is a front view of the lid of the wire harness applied to the first embodiment of the present invention.
Figure 3:
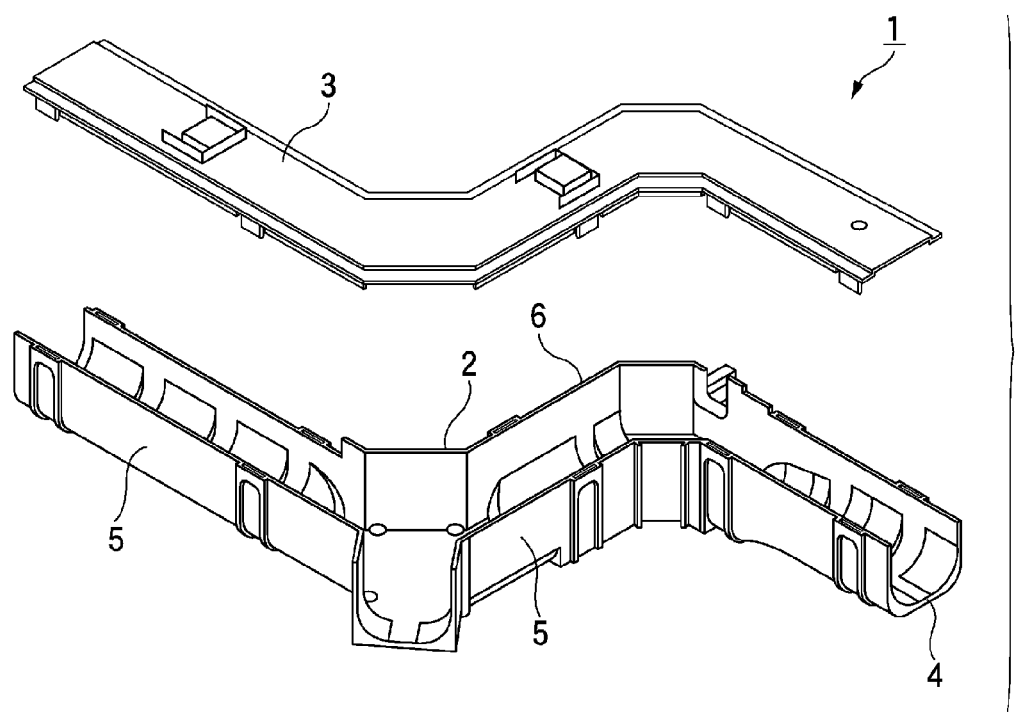
FIG. 3 is an exploded perspective view of a protector of the wire harness applied to the first embodiment of the present invention.
Figure 4:
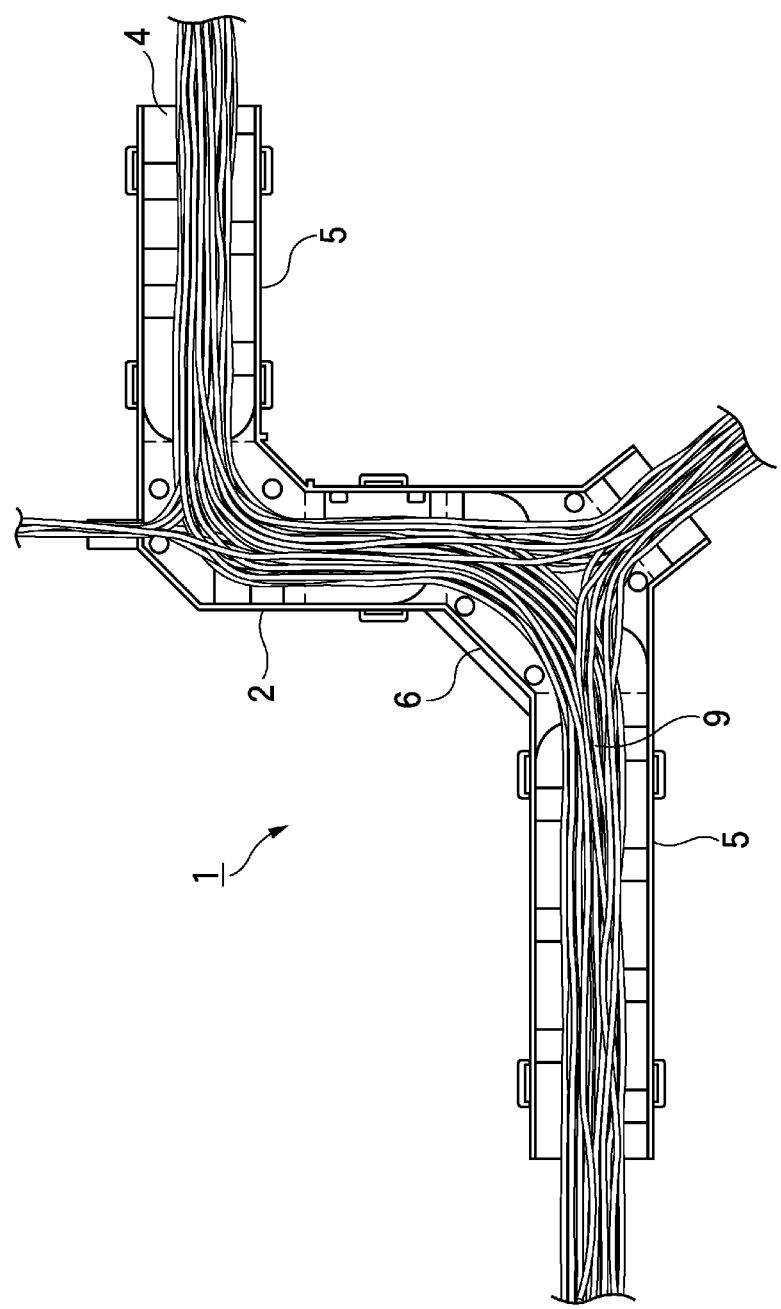
FIG. 4 is a front view of a protector main body of the wire harness applied to the first embodiment of the present invention in a state where a harness is contained in the protector main body.

Next, the structure of a virtual wire harness modeled by the finite element method will be described. FIG. 1A is a perspective view of a protector main body of a wire harness applied to the embodiment of the present invention, and FIG. 1B is a front view of the protector main body of the wire harness applied to the embodiment of the present invention. FIG. 2A is a perspective view of a lid of the wire harness applied to the first embodiment of the present invention, and FIG. 2B is a front view of the lid of the wire harness applied to the first embodiment of the present invention. FIG. 3 is an exploded perspective view of a protector of the wire harness applied to the first embodiment of the present invention. FIG. 4 is a front view of the protector main body of the wire harness applied to the first embodiment of the present invention in a state where a harness is contained in the protector main body.

A wire harness whose shape is to be specified by an analysis device and a program according to the first embodiment of the present invention includes a protector 1 and a harness 9.

The protector 1 is attached, for use, to a prescribed attaching portion within a vehicle of, for example, an automobile or the like. The protector 1 contains, inside thereof, the harness 9 obtained by bundling one wire or a small number of sub harnesses for protecting the harness 9. FIG. 4 illustrates the state where the harness 9 is contained in the protector 1. The protector 1 includes a protector main body 2 and a lid 3.

The protector main body 2 is supposed to be a member made of a resin, and as illustrated in FIGS. 1A and 1B, includes a bottom wall 4 in a plate shape, and two side walls 5 and 6 each in a plate shape rising from the bottom wall 4 to extend vertically to the bottom wall 4, and is formed in the shape of a trough as a whole. Herein, the direction of the side walls 5 and 6 extending from the bottom wall 4 will be mentioned as an upward direction, with the reverse direction mentioned as a downward direction. The protector main body 2 in the shape of a trough is opened upward. In other words, the protector main body 2 is opened in its upper surface. The protector main body 2 contains the harness 9 within a containing space formed inside thereof. In addition, the protector main body 2 is opened in four openings. The harness 9 is guided out through these openings as illustrated in FIG. 4. Besides, the upper ends of the side walls 5 and 6 are provided with latch holes 5a and 6a working as latch portions.

The lid 3 is supposed to be a member made of a resin, and is formed in a plate shape as a whole as illustrated in FIGS. 2A and 2B. Besides, the lid 3 is provided with latch claws 3a formed as latched portions. Each of the latch claws 3a is engaged with a corresponding one of the latch holes 5a and 6a formed on the side walls 5 and 6 of the protector main body 2. The lid 3 covers the opening in the upper surface of the protector main body 2, and is fixed on the protector main body 2 with the latch claws 3a engaged with the opposing latch holes 5a and 6a. Incidentally, to cover the opening in the upper surface of the protector main body 2 with the lid 3 is designated as to close it, and a state where the opening is not covered is designated as an open state.

[Modeling of Wire Harness]

Here, the structure of the virtual wire harness described in [Structure of Wire Harness] is modeled so that the numerical analysis can be performed by the finite element method. The dimensions of the protector 1 and the harness 9 included in the wire harness are set as conditions, so as to subdivide the structure of each member by using elements (meshes).

Besides, a property value is allocated to each element of each member. The property value corresponds to a parameter to be substituted in a basic equation obtained by formulating a physical phenomenon to be followed by the element in reproducing the shape of the wire harness by the numerical analysis. As for the protector 1, a peculiar property value is allocated to each of the protector main body 2 and the lid 3. As for the harness 9, a peculiar property value is allocated to each of an internal conductor, a sheath and an external conductor.

[Calculation of Shape of Wire Harness Containing Harness within Protector]

Next, the wire harness having been modeled as described above, namely, the wire harness in which the structure of each of the members has been subdivided by using elements and a property value has been allocated to each element of each member, is used to specify, by the numerical analysis, the shape of the wire harness in which the harness is contained in the protector. An algorithm to be used for performing the numerical analysis of the shape of the wire harness by the finite element method is disclosed in, for example, Japanese Patent Laid-Open No. 2009-205401. Also in the embodiment of the present invention, this type of algorithm is basically applied to calculate the shape of the wire harness.

In order to specify the shape of the wire harness by the above-described algorithm, it is necessary to reproduce a situation where the harness is contained in the protector, and to calculate the shape of the wire harness in this situation. In order to reproduce such a situation, the following external conditions are added to the wire harness, and the shape of the wire harness is calculated successively through the numerical analysis in accordance with the above-described algorithm so as to satisfy the conditions.

The wire harness in a state where the harness 9 is not contained in the protector main body 2 and the lid 3 is not fixed on the protector main body 2 as illustrated in FIG. 3 is an initial situation of the shape of the wire harness. More specifically, initial coordinates are allocated respectively to the protector main body 2 and the lid 3.

From this initial situation, external conditions for moving a given sub-harness included in the harness 9 toward prescribed coordinates, namely, from the opening of the protector main body 2 toward the center of the side walls 5 and 6, are added, and the shape of the wire harness is calculated successively so as to satisfy the conditions. Besides, external conditions for moving another sub-harness included in the harness 9 toward prescribed coordinates are added, and the shape of the wire harness is calculated successively so as to satisfy the conditions. Such addition of external conditions and calculation of the shape of the wire harness are executed with respect to all sub-harnesses included in the harness 9. These external conditions correspond to formulation of an operation performed by an operator for containing the harness in the protector during the actual production process of the wire harness. Therefore, the order of the sub-harnesses to move toward the prescribed coordinates accords with the order of actually containing the sub-harnesses in the protector.

In the route of moving a sub-harness toward the prescribed coordinates, the influence of gravity on each element, the influence of stress on each element, the influence of elastic force mutually caused between adjacent elements, and the like are reflected in the shape of the wire harness by the above-described algorithm. When a given sub-harness reaches the prescribed coordinates and a convergence condition of an arithmetic operation in the above-described algorithm is satisfied, it is regarded that the movement of the sub-harness has been completed. Then, a next sub-harness is moved to prescribed coordinates, and such processing is repeated until the movement of a last one of the sub-harnesses included in the harness has been completed. In this manner, the harness containing operation performed by the operator is reproduced. FIG. 4 illustrates a state where the harness has been thus contained in the protector main body.

After completing the movement of all the sub-harnesses, external conditions for moving the lid toward prescribed coordinates are added, and the shape of the wire harness is calculated successively so as to satisfy the conditions. Such external conditions correspond to formulation of an operation for closing the protector man body with the lid performed by an operator during the actual production process of the wire harness. Therefore, the prescribed coordinates for moving the lid 3 correspond to coordinates where the respective latch claws 3a are positioned when engaged with the corresponding latch holes 5a and 5b.

In the route of moving the lid 3 toward the prescribed coordinates, the influence of gravity on each element, the influence of stress on each element, the influence of elastic force mutually caused between adjacent elements, and the like are reflected in the shape of the wire harness by the above-described algorithm. Besides, in order to reproduce a situation where the operator presses the lid to fit the latch claws 3a into the corresponding latch holes 5a and 6a, a prescribed downward external force is applied to the upper surface of the lid 3. When the lid 3 reaches the prescribed coordinates and a convergence condition of an arithmetic operation in the above-described algorithm is satisfied, it is regarded that the movement of the lid 3 has been completed, namely, the operation for closing the protector main body with the lid performed by the operator has been completed. In this manner, the operation performed by the operator for closing the protector main body with the lid is reproduced.

[Determination of Harness Containing State]

Figure 5:
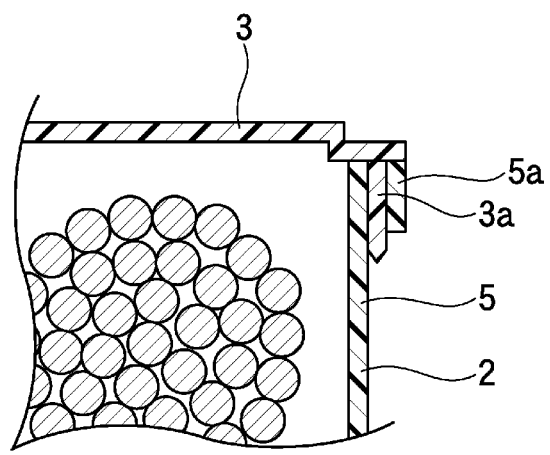
FIG. 5 is a diagram for explaining determination on a harness containing state made in the first embodiment of the present invention.

After completing the movement of the lid 3 as described in [Calculation of Shape of Wire Harness Containing Harness within Protector], a state of containing the harness 9 is subsequently determined. Specifically, it is evaluated whether or not the protector 1 externally protecting the harness 9 is in a shape capable of containing the harness 9 within an inside space surrounded by the protector main body 2 and the lid 3 without allowing the harness 9 to protrude out of the inside space. FIG. 5 is a diagram explaining the determination of a harness containing state made in the first embodiment of the present invention.

FIG. 5 is a cross-sectional view taken on a plane including a latch hole 5a and a latch claw 3a obtained after completing the movement of the lid 3. In the first embodiment of the present invention, for determining the state of containing the harness 9, it is determined whether or not the upper end surfaces of the side walls 5 and 6 of the protector main body 2 are in contact with the lower surface of the lid 3 after completing the movement of the lid 3. Specifically, as illustrated in FIG. 5, it is determined whether or not a pair of elements mutually applying stresses having the same magnitude but in the opposite directions are present in elements positioned on the upper end surface of the side wall 5 of the protector main body 2 and elements positioned on the lower surface of the lid 3. Similarly, it is determined whether or not a pair of elements mutually applying stresses having the same magnitude but in the opposite directions are present in elements positioned on the upper end surface of the side wall 6 of the protector main body 2 and elements positioned on the lower surface of the lid 3. If such a pair of elements are present in each of the side walls 5 and 6, it is regarded that the opening of the protector main body 2 is covered by the lid 3 and that the harness 9 does not protrude out of the inside space surrounded by the protector main body 2 and the lid 3. In this manner, it is determined that the protector 1 including the protector main body 2 and the lid 3 is in a shape capable of containing the harness 9 within the inside space thereof.

On the other hand, if the above-described pair of elements are not present in one of or both of the side walls 5 and 6, it is regarded that the harness 9 protrudes out of the inside space surrounded by the protector main body 2 and the lid 3.

The method for determining the state of containing the harness 9 depending on whether or not the upper end surfaces of the side walls 5 and 6 of the protector main body 2 are in contact with the lower surface of the lid 3 has been described above. Instead of this method, the following method may be employed. As illustrated in FIG. 5, it is determined whether or not the latch holes 5a and 6a of the side walls 5 and 6 of the protector main body 2 are in contact with the latch claws 3a of the lid 3. Specifically, as illustrated in FIG. 5, it is determined whether or not a pair of elements mutually applying stresses having the same magnitude but in the opposite directions are present in elements positioned on inner surfaces of the latch holes 5a of the side wall 5 of the protector main body 2 and elements positioned on outer surfaces of the latch claws 3a of the lid 3. Similarly, it is determined whether or not a pair of elements mutually applying stresses having the same magnitude but in the opposite directions are present in elements positioned on inner surfaces of the latch holes 6a of the side wall 6 of the protector main body 2 and elements positioned on the outer surfaces of the latch claws 3a of the lid 3. If such a pair of elements are present in each of the side walls 5 and 6, it is regarded that the opening of the protector main body 2 is covered by the lid 3 and that the harness 9 does not protrude out of the inside space surrounded by the protector main body 2 and the lid 3.

Alternatively, the method for determining whether or not the latch holes 5a and 6a of the side walls 5 and 6 of the protector main body 2 are in contact with the latch claws 3a of the lid 3 may be performed as the following method. Specifically, it is determined whether or not a part or the whole of one latch claw 3a is positioned within the corresponding latch hole 5a of the side wall 5. Similarly, it is determined whether or not a part or the whole of one latch claw 3a is positioned within the corresponding latch hole 6a of the side wall 6. If the latch holes 5a and 6a and the latch claws 3a in such a state are present in each of the side walls 5 and 6, it is regarded that the opening of the protector main body 2 is covered by the lid 3, and that the harness 9 does not protrude out of the inside space surrounded by the protector main body 2 and the lid 3.

As described so far, according to the first embodiment of the present invention, it can be objectively evaluated whether or not a protector externally protecting a harness is in a shape capable of containing the harness within an inside space of the protector without allowing the harness to protrude out of the inside space. Accordingly, as compared with the conventional evaluation method visually determined by an analyzer (a human), the burden on the analyzer can be reduced.

Second Embodiment

A second embodiment of the present invention will now be described.

In [First Embodiment], the method for determining the state of containing the harness 9 depending on whether or not the upper end surfaces of the side walls 5 and 6 of the protector main body 2 are in contact with the lower surface of the lid 3 is described with reference to FIG. 5. Besides, the method for determining whether or not the latch holes 5a and 6a of the side walls 5 and 6 of the protector main body 2 are in contact with the latch claws 3a of the lid 3 is described. The following method attained by applying these methods is also effective.

If the whole upper end surfaces of the side walls 5 and 6 of the protector main body 2 are in contact with the lower surface of the lid 3, it is regarded that the opening of the protector main body 2 is covered by the lid 3 and that the harness 9 does not protrude out of the inside space surrounded by the protector main body 2 and the lid 3. On the other hand, if a part of the upper end surfaces of the side walls 5 and 6 of the protector main body 2 is not in contact with the lower surface of the lid 3, it is regarded that the harness 9 protrudes out of the inside space surrounded by the protector main body 2 and the lid 3.

Alternatively, if all the latch claws 3a provided on the lid 3 are in contact with the latch holes 5a and 6a of the side walls 5 and 6 of the protector main body 2 in the positions corresponding to the latch claws 3a, it is regarded that the opening of the protector main body 2 is covered by the lid 3 and that the harness 9 does not protrude out of the inside space surrounded by the protector main body 2 and the lid 3. On the other hand, any one of the latch claws 3 provided on the lid 3 is not in contact with a latch hole 5a and 6a of the side wall 5 or 6 of the protector main body 2 in the position corresponding to the latch claw 3a, it is regarded that the harness 9 protrudes out of the inside space surrounded by the protector main body 2 and the lid 3.

When these methods are employed, stricter evaluation can be made in objectively evaluating whether or not the protector is in a shape capable of containing the harness within the inside space thereof.

Third Embodiment

A third embodiment of the present invention will now be described.

Figure 6A:
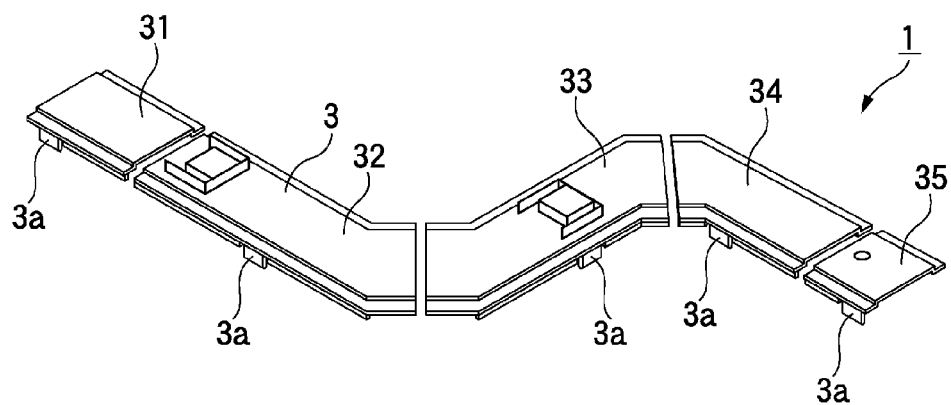
FIG. 6A is a perspective view of a lid of a wire harness applied to a third embodiment of the present invention.
Figure 6B:
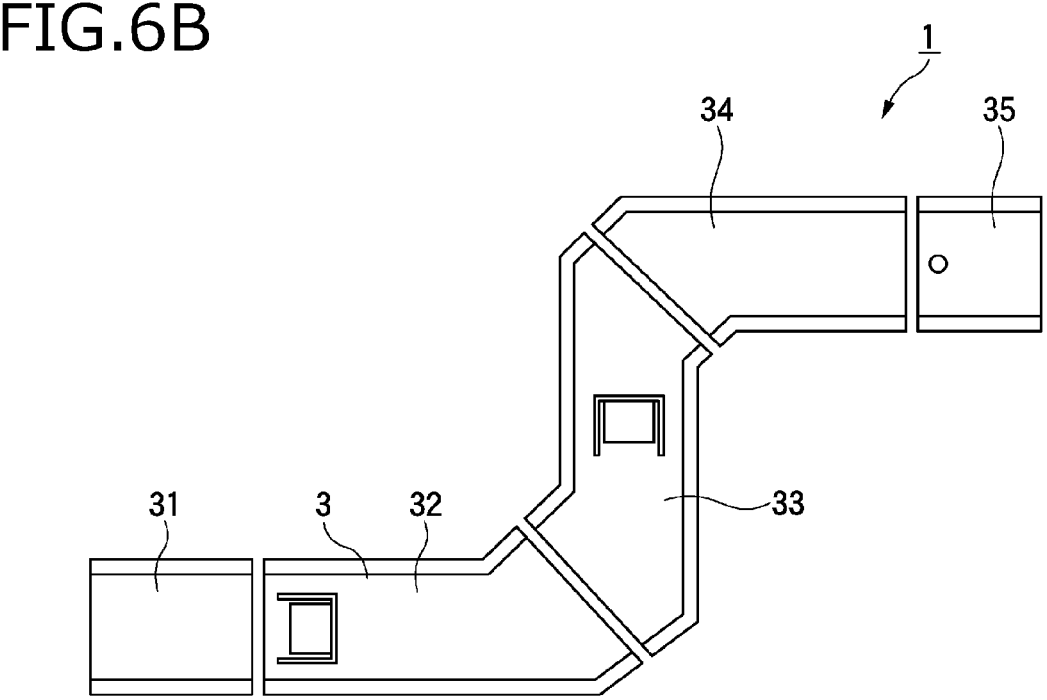
FIG. 6B is a front view of the lid of the wire harness applied to the third embodiment of the present invention.
Figure 7:
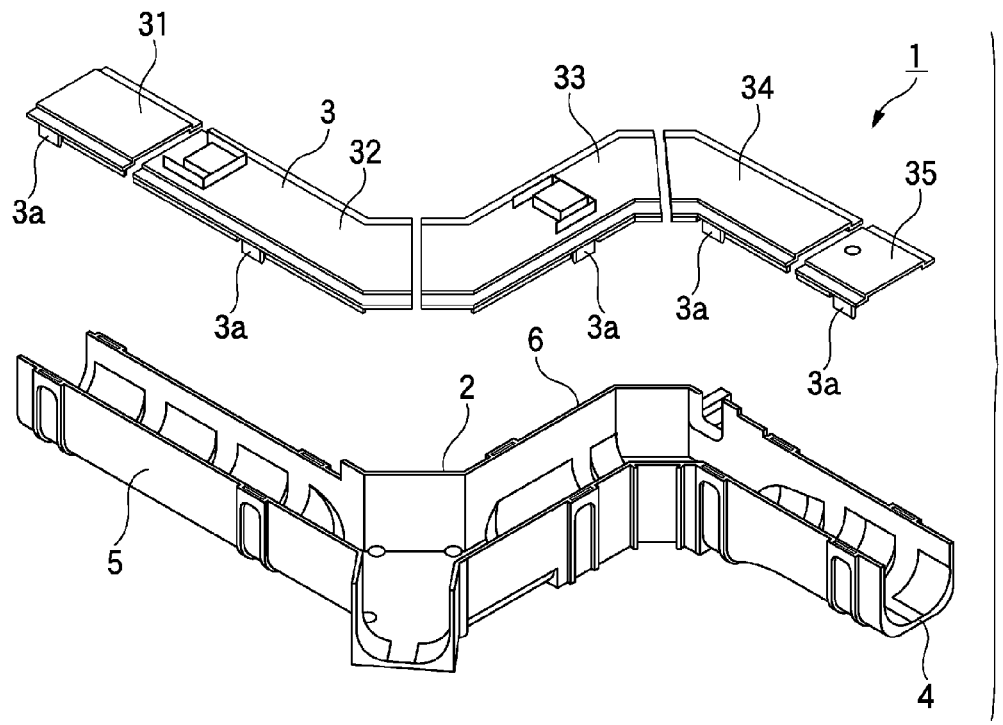
FIG. 7 is an exploded perspective view of a protector of the wire harness applied to the third embodiment of the present invention.

In objectively evaluating whether or not a given protector is in a shape capable of containing a harness within an inside space thereof, it is also significant to specify, if it is evaluated that the protector is not in a shape capable of containing, which part of the protector has a problem. Here, the third embodiment of the present invention accomplished in consideration of this point will be described in detail. FIG. 6A is a perspective view of a lid of a wire harness applied to the third embodiment of the present invention, and FIG. 6B is a front view of the lid of the wire harness applied to the third embodiment of the present invention. FIG. 7 is an exploded perspective view of a protector of the wire harness applied to the third embodiment of the present invention.

[Algorithm for Constructing Image of Shape of Wire Harness]

The description will be omitted because the algorithm is the same as that described in the same item of [First Embodiment].

[Structure of Wire Harness] The description will be omitted because the structure is the same as that described in the same item of [First Embodiment].

[Modeling of Wire Harness] Here, the structure of the virtual wire harness described in [Structure of Wire Harness] is modeled so that the numerical analysis can be performed by the finite element method. The dimensions of the protector 1 and the harness 9 included in the wire harness are set as conditions, so as to subdivide the structure of each member by using elements (meshes).

In the third embodiment, the structure of the modeled wire harness is different from that described in the first embodiment or the second embodiment. Specifically, while the modeled wire harness of the first embodiment or the second embodiment has the structure in which the lid 3 covers the whole opening of the protector main body 2, the modeled wire harness of the third embodiment has a structure in which the lid 3 is divided into lid portions 31 to 35 as illustrated in FIGS. 6A and 6B so that each of the lid portions 31 to 35 can cover a part of the opening of the protector main body 2. In each of the lid portions 31 to 35, a latch claw 3a to be engaged with the latch hole 5a or 6a formed in the side wall 5 or 6 of the protector main body 2 is formed.

Besides, a property value is allocated to each element of each member. The property value corresponds to a parameter to be substituted in a basic equation obtained by formulating a physical phenomenon to be followed by the element in reproducing the shape of the wire harness by the numerical analysis. As for the protector 1, a peculiar property value is allocated to each of the protector main body 2 and the lid 3. As for the harness 9, a peculiar property value is allocated to each of an internal conductor, a sheath and an external conductor.

[Calculation of Shape of Wire Harness Containing Harness within Protector]

Next, the wire harness having been modeled as described above, namely, the wire harness in which the structure of each of the members has been subdivided by using elements and a property value has been allocated to each element of each member, is used to specify, by the numerical analysis, the shape of the wire harness in which the harness is contained in the protector. An algorithm to be used for performing the numerical analysis of the shape of the wire harness by the finite element method is disclosed in, for example, Japanese Patent Laid-Open No. 2009-205401. Also in the embodiment of the present invention, this type of algorithm is basically applied to calculate the shape of the wire harness.

In order to specify the shape of the wire harness by the above-described algorithm, it is necessary to reproduce a situation where the harness is contained in the protector, and to calculate the shape of the wire harness in this situation. In order to reproduce such a situation, the following external conditions are added to the wire harness, and the shape of the wire harness is calculated successively through the numerical analysis in accordance with the above-described algorithm so as to satisfy the conditions.

The wire harness in a state where the harness 9 is not contained in the protector main body 2 and the lid portions 31 to 35 are not respectively fixed on the protector main body 2 as illustrated in FIG. 7 is an initial situation of the shape of the wire harness. More specifically, initial coordinates are allocated respectively to the protector main body 2 and the lid portions 31 to 35.

From this initial situation, external conditions for moving a given sub-harness included in the harness 9 toward prescribed coordinates, namely, from the opening of the protector main body 2 toward the center of the side walls 5 and 6, are added, and the shape of the wire harness is calculated successively so as to satisfy the conditions. Besides, external conditions for moving another sub-harness included in the harness 9 toward prescribed coordinates are added, and the shape of the wire harness is calculated successively so as to satisfy the conditions. Such addition of external conditions and calculation of the shape of the wire harness are executed with respect to all sub-harnesses included in the harness 9. These external conditions correspond to formulation of an operation for containing the harness in the protector performed by an operator during the actual production process of the wire harness. Therefore, the order of the sub-harnesses to move toward the prescribed coordinates accords with the order of actually containing the sub-harnesses in the protector.

In the route of moving a sub-harness toward the prescribed coordinates, the influence of gravity on each element, the influence of stress on each element, the influence of elastic force mutually caused between adjacent elements, and the like are reflected in the shape of the wire harness by the above-described algorithm. When a given sub-harness reaches the prescribed coordinates and a convergence condition of an arithmetic operation in the above-described algorithm is satisfied, it is regarded that the movement of the sub-harness has been completed. Then, a next sub-harness is moved to prescribed coordinates, and such processing is repeated until the movement of a last one of the sub-harnesses included in the harness has been completed. In this manner, the harness containing operation performed by the operator is reproduced.

After completing the movement of all the sub-harnesses, external conditions for moving each of the lid portions 31 to 35 toward prescribed coordinates are added, and the shape of the wire harness is calculated successively so as to satisfy the conditions. Such external conditions correspond to formulation of an operation for closing the protector main body with the lid performed by an operator during the actual production process of the wire harness. Therefore, the prescribed coordinates for moving each of the lid portions 31 to 35 correspond to coordinates where the respective latch claws 3a are positioned when engaged with the corresponding latch holes 5a and 5b.

In the route of moving each of the lid portions 31 to 35 toward the prescribed coordinates, the influence of gravity on each element, the influence of stress on each element, the influence of elastic force mutually caused between adjacent elements, and the like are reflected in the shape of the wire harness by the above-described algorithm. Besides, in order to reproduce a situation where the operator presses the lid to fit the latch claws 3a into the corresponding latch holes 5a and 6a, a prescribed downward external force is applied to the upper surface of each of the lid portions 31 to 35. When any one of the lid portions 31 to 35 reaches the prescribed coordinates and a convergence condition of an arithmetic operation in the above-described algorithm is satisfied, it is regarded that the movement of that lid portion has been completed, and another one of the lid portions 31 to 35 is moved toward prescribed coordinates. Then, when the movement of all the lid portions 31 to 35 has been completed, it is regarded that the operation for closing the protector main body with the lid performed by the operator has been completed. In this manner, the operation performed by the operator for closing the protector main body with the lid is reproduced.

[Determination of Harness Containing State]

After completing the movement of the lid portions 31 to 35 as described in [Calculation of Shape of Wire Harness Containing Harness within Protector], a state of containing the harness 9 is subsequently determined. Specifically, it is evaluated whether or not the protector 1 externally protecting the harness 9 is in a shape capable of containing the harness 9 within an inside space surrounded by the protector main body 2 and the lid portions 31 to 35 without allowing the harness 9 to protrude out of the inside space.

In the third embodiment of the present invention, for determining the state of containing the harness 9, it is determined whether or not the upper end surfaces of the side walls 5 and 6 of the protector main body 2 are in contact with the lower surfaces of the lid portions 31 to 35 after completing the movement of the lid portions 31 to 35. Specifically, as described in the first embodiment with reference to FIG. 5, it is determined whether or not a pair of elements mutually applying stresses having the same magnitude but in the opposite directions are present in elements positioned on the upper end surface of the side wall 5 of the protector main body 2 and elements positioned on the lower surfaces of the lid portions 31 to 35. Similarly, it is determined whether or not a pair of elements mutually applying stresses having the same magnitude but in the opposite directions are present in elements positioned on the upper end surface of the side wall 6 of the protector main body 2 and elements positioned on the lower surfaces of the lid portions 31 to 35. If such a pair of elements are present in each of the side walls 5 and 6 with respect to a given one of the lid portions 31 to 35, it is regarded that a part of the opening of the protector main body 2 is covered by one of the lid portions 31 to 35. Besides, if such a pair of elements are present in both the side walls 5 and 6 with respect to all the lid portions 31 to 35, it is regarded that the harness 9 does not protrude out of the inside space surrounded by the protector main body 2 and the lid portions 31 to 35. In this manner, it is determined that the protector 1 including the protector main body 2 and the lid 3 is in a shape capable of containing the harness 9 within the inside space thereof.

On the other hand, if the above-described pair of elements are not present in one of or both of the side walls 5 and 6 with respect to a given one of the lid portions 31 to 35, it is regarded that the harness 9 protrudes out of the inside space surrounded by the protector main body 2 and the lid 3. Besides, a lid portion not having the pair of elements is specified, so as to evaluate that the harness 9 protrudes out of the inside space through a portion sandwiched between that lid portion and the protector main body. In this manner, a portion where the harness 9 protrudes out of the protector 1 can be specified.

The method for determining the state of containing the harness 9 depending on whether or not the upper end surfaces of the side walls 5 and 6 of the protector main body 2 are in contact with the lower surfaces of the lid portions 31 to 35 has been described above. Instead of this method, the following method may be employed. As described in the first embodiment with reference to FIG. 5, it is determined whether or not the latch holes 5a and 6a of the side walls 5 and 6 of the protector main body 2 are in contact with the latch claws 3a of the lid portions 31 to 35. Specifically, it is determined whether or not a pair of elements mutually applying stresses having the same magnitude but in the opposite directions are present in elements positioned on inner surfaces of the latch holes 5a of the side wall 5 of the protector main body 2 and elements positioned on outer surfaces of the latch claws 3a of the lid portions 31 to 35. Similarly, it is determined whether or not a pair of elements mutually applying stresses having the same magnitude but in the opposite directions are present in elements positioned on inner surfaces of the latch holes 6a of the side wall 6 of the protector main body 2 and elements positioned on the outer surfaces of the latch claws 3a of the lid portions 31 to 35. If such a pair of elements are present in each of the side walls 5 and 6 with respect to all the lid portions 31 to 35, it is regarded that the opening of the protector main body 2 is covered by the lid 3 and that the harness 9 does not protrude out of the inside space surrounded by the protector main body 2 and the lid 3.

Alternatively, the method for determining whether or not the latch holes 5a and 6a of the side walls 5 and 6 of the protector main body 2 are in contact with the latch claws 3a of the lid portions 31 to 35 may be performed as the following method. Specifically, it is determined whether or not a part or the whole of one latch claw 3a is positioned within the corresponding latch hole 5a of the side wall 5. Similarly, it is determined whether or not a part or the whole of one latch claw 3a is positioned within the corresponding latch hole 6a of the side wall 6. If the latch holes 5a and 6a and the latch claws 3a in such a state are present in each of the side walls 5 and 6 with respect to all the lid portions 31 to 35, it is regarded that the opening of the protector main body 2 is covered by the lid 3, and that the harness 9 does not protrude out of the inside space surrounded by the protector main body 2 and the lid 3.

As described so far, according to the third embodiment of the present invention, it can be objectively evaluated whether or not a protector externally protecting a harness is in a shape capable of containing the harness within an inside space of the protector without allowing the harness to protrude out of the inside space. Accordingly, as compared with the conventional evaluation method visually determined by an analyzer (a human), the burden on the analyzer can be reduced.

Besides, according to the third embodiment of the present invention, a portion where the harness 9 protrudes out of the inside space of the protector 1 can be specified by specifying any one of the lid portions 31 to 35 not fixed on the protector main body 2. Therefore, the evaluation can be made also on which portion of the protector has a problem.

The case where the lid 3 is divided to evaluate the protrusion of the harness 9 out of the inside space with respect to each of the lid portions 31 to 35 as in the third embodiment of the present invention is effective also in the following points: In the case where the lid 3 covers the whole opening of the protector main body 2 as described in the first embodiment or the second embodiment, if the harness 9 largely protrudes in a given portion (for example, in a center portion along the lengthwise direction of the protector 1), any portion of the lower surface of the lid 3 may not be in contact with the upper end surfaces of the side walls 5 and 6 of the protector main body 2 in some cases. On the other hand, in the case where the whole opening of the protector main body 2 is covered by the lid portions 31 to 35 as described in the third embodiment, if the harness 9 largely protrudes in a given portion (for example, in a center portion along the lengthwise direction of the protector 1), although the lower surface of a given lid portion is not in contact with the upper end surfaces of the side walls 5 and 6 of the protector main body 2, the lower surfaces of the other lid portions are in contact with the upper end surfaces of the side walls 5 and 6 of the protector main body 2. Thus, it can be specified, in the third embodiment, which portion of the protector has a problem, and conversely, it can be said that this is a method by which a portion having no problem can be specified. In the third embodiment, either which portion of the protector has a problem or which portion of the protector has no problem can be obtained as a result of the evaluation.

[Hardware Configuration]

Figure 8:
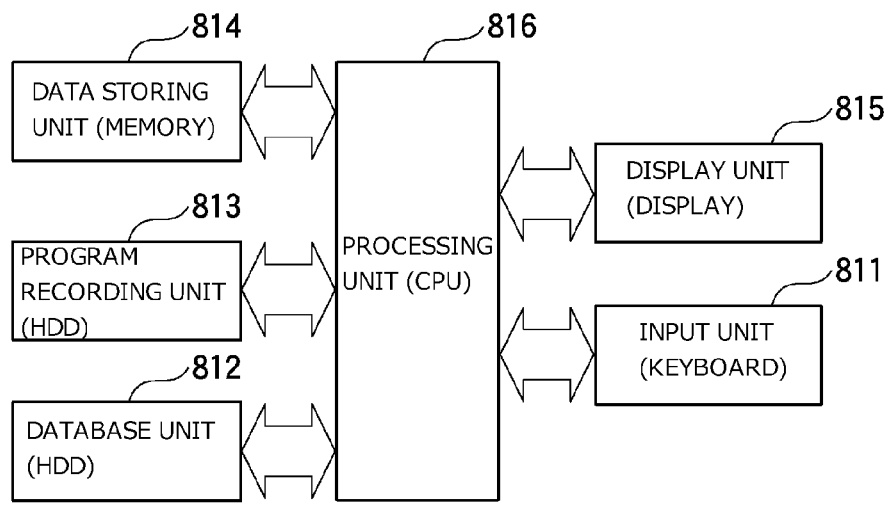
FIG. 8 is a block diagram illustrating hardware configuration of an analysis device according to an embodiment of the present invention.

FIG. 8 is a block diagram illustrating the hardware configuration of an analysis device according to an embodiment of the present invention. The analysis device of the embodiment of the present invention includes an input unit 811, a database unit 812, a program recording unit 813, a data storing unit 814, a display unit 815 and a processing unit 816. If the analysis device of the present invention is configured by using, for example, a general-purpose PC, the input unit 811 is realized by various input interfaces such as a keyboard, a mouse and a numerical keypad, the database unit 812 and the program recording unit 813 are realized by a hard disk drive (HDD), the data storing unit 814 is realized by a RAM (Random Access Memory), the display unit 815 is realized by any of various output devices such as a CRT display and a liquid crystal display, and the processing unit 816 is realized by a CPU (Central Processing Unit).

The database unit 812 stores information on the shapes and the physical values of the protector 1 and the harness 9 to be used in modeling a wire harness. Besides, the program recording unit 813 stores a program in which the algorithm described above in [Algorithm for Constructing Image of Shape of Wire Harness] is coded. Furthermore, the data storing unit 814 stores data input/output to/from the processing unit 816 executing the arithmetic operations described in [Calculation of Shape of Wire Harness Containing Harness within Protector].

The characteristics of the embodiments of the analysis device and the program of the present invention described so far are summarized in the following [1] to [4]:

[1] An analysis device for evaluating whether or not a lid (3) for covering an opening of a protector main body (2) is attachable to the protector main body (2) with a harness (9) contained inside through the opening, the analysis device including:

a memory unit (a database unit 812) configured to store a physical value of an element corresponding to a part of the harness (9), a physical value of an element corresponding to a part of the protector main body (2) and a physical value of an element corresponding to a part of the lid (3) in a modeled wire harness with respect to each of the elements;

a recording unit (a program recording unit 813) configured to record a program for expressing an analysis order on the basis of conditions for specifying a given element or a relationship between elements; and an arithmetic processing unit (a processing unit 816) that determines, by referring to the physical value of each of the elements stored in the memory unit (the database unit 812) and the program recorded in the recording unit (the program recording unit 813), whether or not the protector main body (2) and the lid (3) are in contact with each other in reproducing a state where the harness (9) is contained inside the protector main body (2) and the opening of the protector main body (2) is covered by the lid (3).

[2] The analysis device according to [1] above, in which a physical value of an element corresponding to a part of the lid (3) divided, for modeling, into a first lid portion (any of 31 to 35) and a second lid portion (any of 31 to 35) is stored in the memory unit (the database unit 812) with respect to each element, and the arithmetic processing unit (the processing unit 816) determines whether or not the protector main body (2) and the first lid portion (any of 31 to 35) are in contact with each other and whether or not the protector main body (2) and the second lid portion (any of 31 to 35) are in contact with each other.

[3] The analysis device according to [2] above, in which a physical value of an element corresponding to a part of the protector main body (2) including a first latch portion (a latch hole 5a or 6a) and a second latch portion (a latch hole 5a or 6a), and a physical value of an element corresponding to a part of the lid (3) divided, for modeling, into the first lid portion (any of 31 to 35) having a first latched portion (a latch claw 3a) and the second lid portion (any of 31 to 35) having a second latched portion (a latch claw 3a) are stored in the memory unit (the database unit 812) with respect to each element, and the arithmetic processing unit (the processing unit 816) determines whether or not the first latch portion (the latch hole 5a or 6a) and the first latched portion (the latch claw 3a) are in contact with each other and whether or not the second latch portion (the latch hole 5a or 6a) and the second latched portion (the latch claw 3a) are in contact with each other.

[4] A program for causing a computer to function as the memory unit (the database unit 812), the recording unit (the program recording unit 813) and the arithmetic processing unit (the processing unit 816) according to any one of [1] to [3] above.

Although the present invention has been described in detail with reference to the specific embodiments, it will be obvious for those skilled in the art that various modifications and changes can be made without departing from the spirit and the scope of the present invention.

The present invention provides an effect that it can be objectively evaluated whether or not a protector for externally protecting a harness is in a shape capable of containing the harness within an inside space of the protector without allowing the harness to protrude out of the inside space. The present invention having this effect is useful for an analysis device that constructs an image of the shape of a wire harness through arithmetic processing and a program executed by the analysis device.

What is claimed is:

1. An analysis device for evaluating whether or not a lid for covering an opening of a protector main body is attachable to the protector main body with a wire harness contained inside through the opening, the analysis device comprising:

a memory storing a value of an element corresponding to a part of the wire harness, a value of an element corresponding to a part of the protector main body, and a value of an element corresponding to a part of the lid, in a modeled assembly with respect to each of the elements;

a storage medium storing a program for simulating a shape of the wire harness; and a processor that determines, by referring to the value of each of the elements stored in the memory and executing the program stored in the storage medium to perform a simulation, whether or not the protector main body and the lid are in contact with each other in a state where the wire harness is contained inside the protector main body and the opening of the protector main body is at least partially covered by the lid, wherein the processor determines whether or not the protector main body and the lid are in contact with each other by determining whether a pair of elements respectively disposed on the protector main body and the lid apply stresses having a same magnitude but in opposite directions.

2. The analysis device according to claim 1, wherein a value of an element corresponding to a part of the lid divided, for modeling, into a first lid portion is stored in the memory;

wherein a value of an element corresponding to a part of the lid divided, for modeling, into a second lid portion is stored in the memory; and wherein the processor determines whether or not the protector main body and the first lid portion are in contact with each other, and whether or not the protector main body and the second lid portion are in contact with each other.

3. The analysis device according to claim 2, wherein the memory stores:

a value of an element corresponding to a part of the protector main body including a first latch portion;

a value of an element corresponding to a part of the protector main body including a second latch portion, a value of an element corresponding to a part of the lid divided, for modeling, into the first lid portion having a first latched portion, a value of an element corresponding to a part of the lid divided, for modeling, into the second lid portion having a second latched portion; and wherein the processor determines whether or not the first latch portion and the first latched portion are in contact with each other, and whether or not the second latch portion and the second latched portion are in contact with each other.

4. The analysis device according to claim 1, wherein the memory stores:

a value of an element corresponding to a part of the protector main body including a first latch portion;

a value of an element corresponding to a part of the protector main body including a second latch portion, a value of an element corresponding to a part of the lid divided, for modeling, into a first lid portion having a first latched portion, a value of an element corresponding to a part of the lid divided, for modeling, into a second lid portion having a second latched portion; and wherein the processor determines whether or not the first latch portion and the first latched portion are in contact with each other, and whether or not the second latch portion and the second latched portion are in contact with each other.

5. A method for evaluating whether or not a lid for covering an opening of a protector main body is attachable to the protector main body with a wire harness contained inside through the opening, the method comprising:

storing, in a memory:

a value of an element corresponding to a part of the wire harness, a value of an element corresponding to a part of the protector main body, and a value of an element corresponding to a part of the lid, in a modeled assembly with respect to each of the elements;

storing, in a storage medium, a program for simulating a shape of the wire harness; and determining, by referring to the value of each of the elements stored in the memory and executing the program stored in the storage medium to perform a simulation, whether or not the protector main body and the lid are in contact with each other in a state where the wire harness is contained inside the protector main body and the opening of the protector main body is at least partially covered by the lid, wherein the determining comprises analyzing whether or not the protector main body and the lid are in contact with each other by determining whether a pair of elements respectively disposed on the protector main body and the lid apply stresses having a same magnitude but in opposite directions.

* * * * *